US011941562B2

(12) United States Patent
Takahashi et al.

(10) Patent No.: US 11,941,562 B2
(45) Date of Patent: Mar. 26, 2024

(54) OPERATION ANALYSIS METHOD, OPERATION ANALYSIS DEVICE, AND OPERATION ANALYSIS PROGRAM

(71) Applicants: KOBELCO CONSTRUCTION MACHINERY CO., LTD., Hiroshima (JP); HIROSHIMA UNIVERSITY, Higashi-Hiroshima (JP)

(72) Inventors: Katsuhiko Takahashi, Hiroshima (JP); Katsumi Morikawa, Hiroshima (JP); Shoya Nakamura, Hiroshima (JP)

(73) Assignees: KOBELCO CONSTRUCTION MACHINERY CO., LTD., Hiroshima (JP); HIROSHIMA UNIVERSITY, Higashi-Hiroshima (JP)

(*) Notice: Subject to any disclaimer, the term of this patent is extended or adjusted under 35 U.S.C. 154(b) by 384 days.

(21) Appl. No.: 17/440,013

(22) PCT Filed: Feb. 6, 2020

(86) PCT No.: PCT/JP2020/004683
§ 371 (c)(1),
(2) Date: Sep. 16, 2021

(87) PCT Pub. No.: WO2020/202788
PCT Pub. Date: Oct. 8, 2020

(65) Prior Publication Data
US 2022/0172133 A1 Jun. 2, 2022

(30) Foreign Application Priority Data
Mar. 29, 2019 (JP) ................. 2019-065247

(51) Int. Cl.
*G06Q 10/0633* (2023.01)
(52) U.S. Cl.
CPC ............... *G06Q 10/0633* (2013.01)

(58) Field of Classification Search
CPC ...... E04G 23/082; B25J 9/1669; B62D 67/00; G06Q 10/0633; G06Q 50/08; Y02W 30/56; G05B 2219/45063; G05B 2219/2616
See application file for complete search history.

(56) References Cited

U.S. PATENT DOCUMENTS 11,485,436 B2 * 11/2022 Tanaka .................. B25J 11/005
11,498,210 B2 * 11/2022 Oka ....................... B25J 9/1653
(Continued)

FOREIGN PATENT DOCUMENTS

| CN | 103143554 A | 6/2013 |
| CN | 204373400 U | 6/2015 |

(Continued)

OTHER PUBLICATIONS

Extended European Search Report dated Feb. 23, 2022 in European Patent Application No. 20784078.6, 10 pages.
(Continued)

*Primary Examiner* — An H Do
(74) *Attorney, Agent, or Firm* — Oblon, McClelland, Maier & Neustadt, L.L.P.

(57) ABSTRACT

Based on operation trajectory data an operation analysis device identifies all open points indicating positions at which the crusher is opened during the operation period and all close points indicating positions at which a crusher is closed during an operation period, calculates, as a shortest distance, a distance between each open point of the all open points and a close point nearest to the each open point, and identifies, as a sorting destination open point, an open point at which the shortest distance exceeds a first threshold value, identifies data until the crusher grasping the dismantling part moves to the sorting destination and returns to the dismantling target again from among the operation trajectory data as movement data of the crusher having moved in the (Continued)

dismantling operation, and identifies data in which the movement data has been removed from the operation trajectory data as grasping operation data.

7 Claims, 16 Drawing Sheets

(56) References Cited

U.S. PATENT DOCUMENTS

2008/0051928 A1 2/2008 Lee
2017/0255895 A1 9/2017 Kozumi et al.

FOREIGN PATENT DOCUMENTS

| JP | 2010-138657 A | 6/2010 |
| JP | 2017-141552 A | 8/2017 |
| WO | WO 2016/125915 A1 | 8/2016 |
| WO | WO 2019/046965 A1 | 3/2019 |

OTHER PUBLICATIONS

International Search Report dated Mar. 10, 2020 in PCT/JP2020/004683 filed on Feb. 6, 2020, 2 pages.

* cited by examiner

| TIME INFORMATION | POSITION INFORMATION | | NIBBLER OPEN/CLOSE INFORMATION |
|---|---|---|---|
| | X COORDINATE | Y COORDINATE | |
| T1 | X1 | Y1 | S1 |
| T2 | X2 | Y2 | S2 |
| T3 | X3 | Y3 | S3 |
| T4 | X4 | Y4 | S4 |
| T5 | X5 | Y5 | S5 |
| ⋮ | ⋮ | ⋮ | ⋮ |

FIG. 8
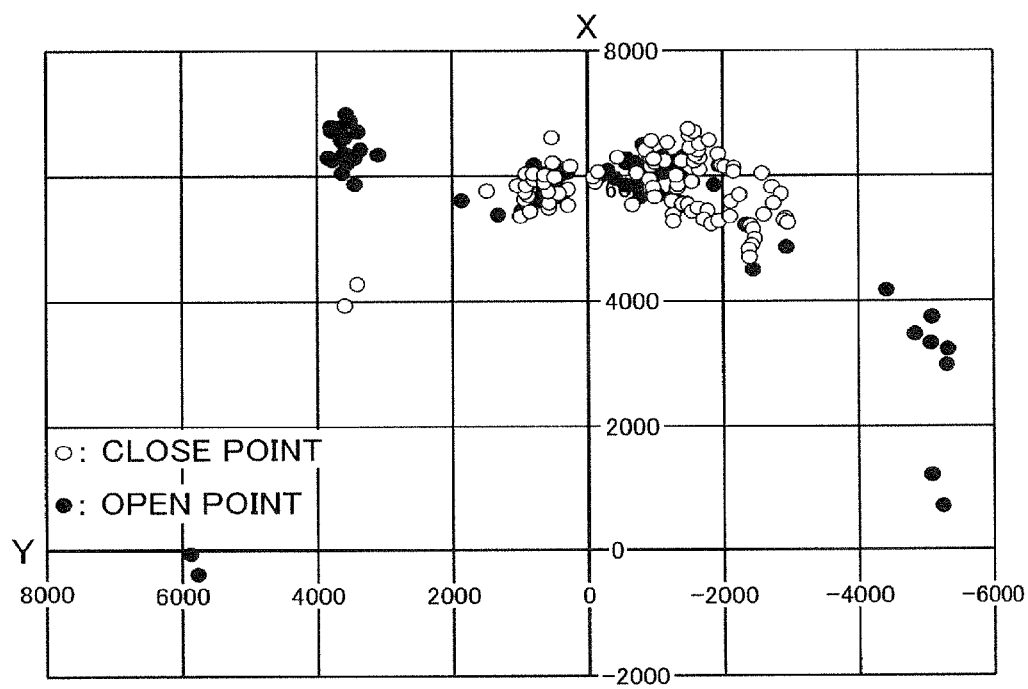
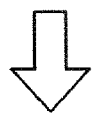
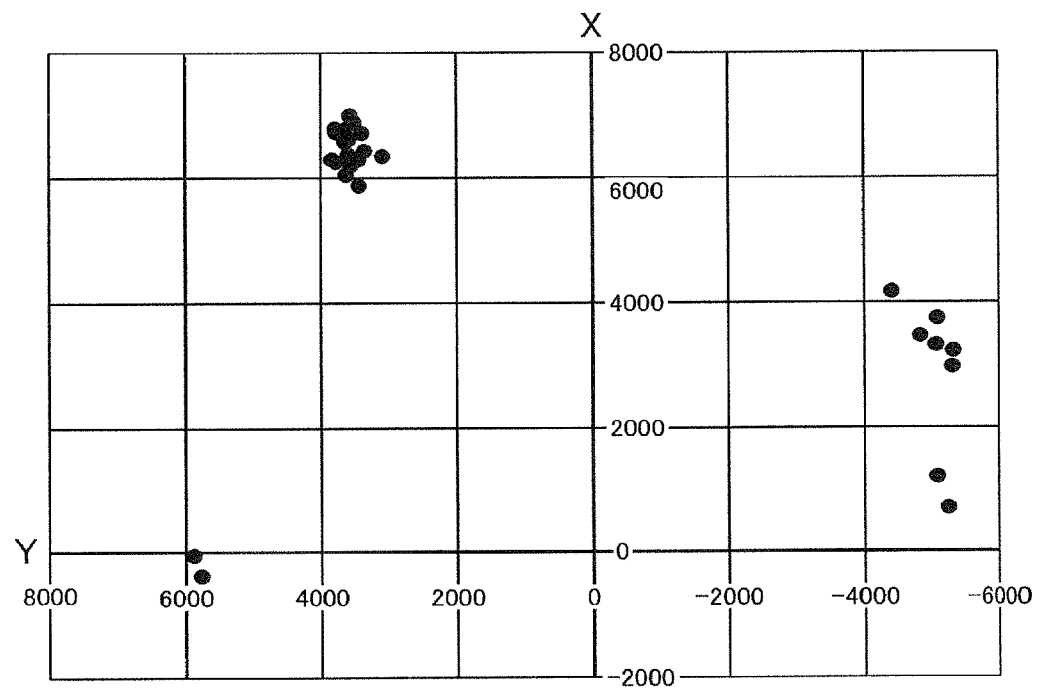

FIG. 10
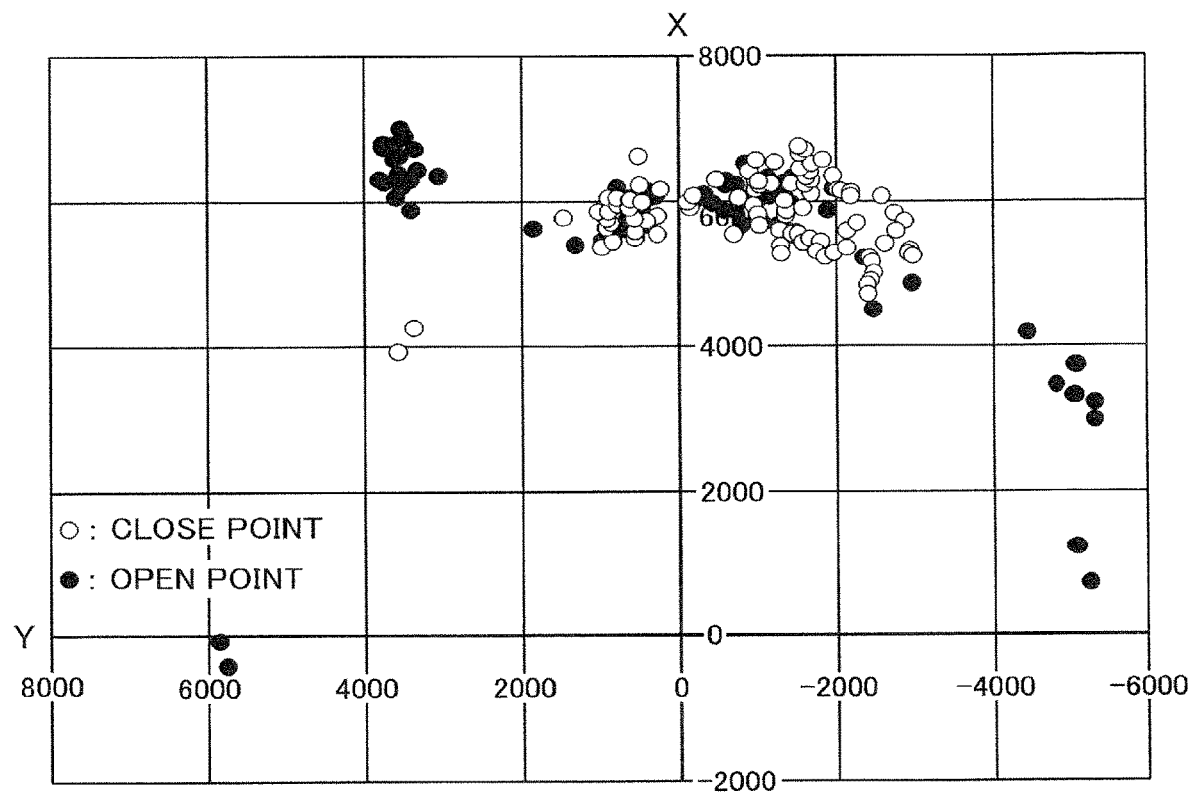
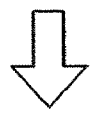
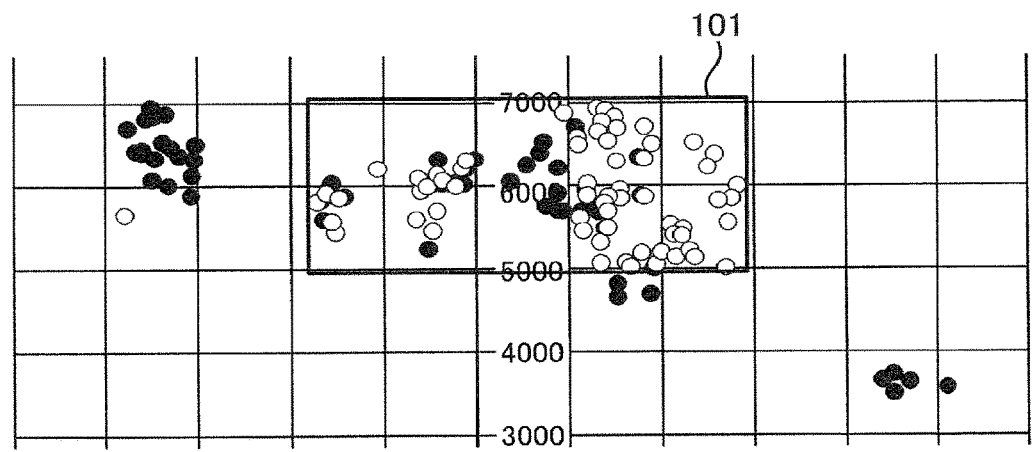

FIG. 12

BEFORE INTEGRATION : 3-3-2-2-3-3-4-2-2-2-3-3-2-1-3-3-2-2-2-2-1-3-3-2-5-5-4-1-5-5-5-5-5-5

FIG. 13

BEFORE INTEGRATION : 3-3-[SKIP 2-2]-3-3-[SKIP 4-2-2-2]-3-3-[SKIP 2-1]-3-3-[SKIP 2-2-2-2-1]-3-3-2-5-5-[SKIP 4-1]-5-5-5-5-5-5

- CONVERT TO 3
- CONVERT TO 3
- CONVERT TO 3
- CONVERT TO 3
- CONVERT TO 5

FIG. 14

AFTER INTEGRATION : 3-3-3-3-3-3-3-3-3-3-3-3-3-3-3-3-3-3-3-3-3-3-3-2-5-5-5-5-5-5-5-5-5-5

| OPERATION CYCLE | ELEMENT OPERATION TIME | | SORTING DESTINATION NIBBLER OPEN POINT | | | CENTER OF GRAVITY OF DISMANTLING PLACE | | | NIBBLER CLOSE | |
|---|---|---|---|---|---|---|---|---|---|---|
| NUMBER | START TIME | GRASPING TIME | MOVEMENT TIME | x | y | CLUSTER | x | y | CLUSTER | NUMBER OF TIMES | TIME |
| 1 | 466 | 14.21 | 7.02 | 7008.22064 | 3565.091002 | 0 | 6132.050946 | -1513.903721 | 0 | 2 | 4.77 |
| 2 | 487.23 | 122.43 | 5.47 | 6370.302475 | 3091.535395 | 0 | 5875.458444 | -777.951469 | 0 | 15 | 55.49 |
| 3 | 615.13 | 7.77 | 4.87 | 6312.004073 | 3527.65984 | 0 | 5890.272798 | 586.736531 | 0 | 2 | 3.17 |
| 4 | 627.77 | 51.37 | 9.26 | 6625.704602 | 3650.045063 | 0 | 5720.631689 | 1046.782459 | 0 | 2 | 45.67 |
| 5 | 688.4 | 19.44 | 5.23 | 6792.829636 | 3795.411796 | 0 | 5979.609162 | -700.921199 | 0 | 4 | 8.97 |
| 6 | 713.07 | 9.86 | 5.17 | 1220.019455 | -5101.354389 | 1 | 5993.79536 | -1107.954303 | 0 | 2 | 3.84 |
| 7 | 728.1 | 27.91 | 5.89 | 6591.403666 | 3610.557374 | 0 | 5572.953346 | -620.689169 | 0 | 4 | 13.98 |
| 8 | 761.9 | 11.31 | 4.9 | 6355.70411 | 3423.088427 | 0 | 5596.665517 | 841.378698 | 0 | 1 | 5.11 |
| 9 | 778.11 | 22.08 | 7.57 | 6446.945649 | 3365.90573 | 0 | 5980.292957 | 641.049989 | 0 | 3 | 13.67 |
| 10 | 807.76 | 38.46 | 6.55 | 725.98258 | -5261.381369 | 1 | 5671.812858 | 543.54589 | 0 | 7 | 18.68 |
| 11 | 852.77 | 18.53 | 4.89 | 6292.954972 | 3477.481215 | 0 | 6135.859664 | -724.185305 | 0 | 3 | 12.79 |
| 12 | 876.19 | 69.67 | 10.15 | 6884.718307 | 3520.245826 | 0 | 6139.883186 | -1187.365314 | 0 | 8 | 29.5 |
| .. | .. | .. | .. | .. | .. | .. | .. | .. | .. | .. | .. |
| .. | .. | .. | .. | .. | .. | .. | .. | .. | .. | .. | .. |

| | | Number of Times — Collection Object | | | | | Time/Operation Cycle — Grasping | | | | Time/Operation Cycle — Movement | | | |
|---|---|---|---|---|---|---|---|---|---|---|---|---|---|---|
| | | HARNESS | LEFT FRONT | LEFT BACK | RIGHT | SUM | MAXIMUM | MINIMUM | MEAN | STANDARD DEVIATION | MAXIMUM | MINIMUM | MEAN | STANDARD DEVIATION |
| DISMANTLING PORTION | DASHBOARD | 17 | 1 | 0 | 4 | 22 | 122.4 | 7.8 | 29.6 | 27.1 | 17.7 | 4.7 | 6.6 | 2.7 |
| | ENGINE ROOM | 5 | 1 | 1 | 4 | 11 | 31.6 | 2.8 | 12.9 | 10.0 | 12.9 | 3.2 | 6.5 | 3.0 |
| | OTHERS | 1 | 0 | 0 | 0 | 1 | 64.8 | 64.8 | 64.8 | / | 1.9 | 1.9 | 1.9 | / |
| | SUM | 23 | 2 | 1 | 8 | 34 | 122.4 | 2.8 | 24.9 | 24.4 | 17.7 | 1.9 | 6.6 | 2.7 |
| GRASPING | MAXIMUM | 122.4 | 32.1 | 6.1 | 38.5 | 122.4 | | | | | | | | |
| | MINIMUM | 4.0 | 2.8 | 6.1 | 4.5 | 2.8 | | | | | | | | |
| | MEAN | 28.8 | 17.4 | 6.1 | 18.1 | 24.9 | | | | | | | | |
| | STANDARD DEVIATION | 28.3 | 20.7 | / | 12.4 | 24.4 | | | | | | | | |
| MOVEMENT | MAXIMUM | 17.7 | 8.2 | 12.9 | 7.7 | 17.7 | | | | | | | | |
| | MINIMUM | 1.9 | 6.9 | 12.9 | 3.2 | 1.9 | | | | | | | | |
| | MEAN | 6.6 | 7.5 | 12.9 | 5.4 | 6.6 | | | | | | | | |
| | STANDARD DEVIATION | 2.8 | 0.9 | / | 1.6 | 2.7 | | | | | | | | |

OPERATION ANALYSIS METHOD, OPERATION ANALYSIS DEVICE, AND OPERATION ANALYSIS PROGRAM

TECHNICAL FIELD

The present invention relates to a technique for analyzing a dismantling operation of repeating an action of grasping a dismantling part from a dismantling target by a crusher attached to an operation attachment tip of a dismantling machine and an action of moving the grasped dismantling part to a sorting destination.

BACKGROUND ART

Conventionally, a dismantling machine is known in which a crusher (e.g., nibbler) is attached to an operation attachment tip. For example, in Patent Literature 1, a crusher (9) is attached to the tip of an arm (8) constituting a part of an attachment (4) in a dismantling machine (1) (see FIG. 1 of Patent Literature 1).

An end-of-life vehicles dismantling machine including a crusher is used for collecting recyclable parts (dismantling parts) such as copper wire included in the end-of-life vehicle. Such operation requires improvement in the collection rate of dismantling parts and improvement in the efficiency of operation time.

However, since the mechanical operation of the end-of-life vehicle dismantling machine is complicated and difficult, the dismantling operation by an unskilled operator is more likely to be wasteful than the dismantling operation by a skilled operator. In order to improve the skill of the unskilled operator, it is necessary to analyze the dismantling operation of the unskilled operator and identify the wasteful operations.

As a conventional analysis method for analyzing the dismantling operation by the crusher, for example, it is assumed that an analyst manually acquires various types of information regarding the dismantling operation while viewing an operation moving image captured during the dismantling operation period, and analyzes the dismantling operation based on the acquired information.

However, since the conventional analysis method described above requires a considerable amount of time, it is not necessarily an efficient method, and further improvement has been required.

CITATION LIST

Patent Literature

Patent Literature 1: JP 2017-141552 A

SUMMARY OF INVENTION

The present invention has been made to solve the above problems, and an object thereof is to provide a technique capable of efficiently analyzing a dismantling operation by a crusher.

An operation analysis method according to an aspect of the present invention is an operation analysis method in an operation analysis device that analyzes a dismantling operation of repeating an action of grasping a dismantling part from a dismantling target by a crusher attached to an attachment tip of a dismantling machine and an action of moving the grasped dismantling part to a sorting destination, the operation analysis method including: a first step of acquiring operation trajectory data in which position information and open/close information of the crusher during an operation period of the dismantling operation are recorded in time series; a second step of identifying, based on the operation trajectory data, all open points indicating positions at which the crusher is opened during the operation period and all close points indicating positions at which the crusher is closed during the operation period; a third step of calculating, as a shortest distance, a distance between each open point of the all open points and a close point nearest to the each open point, and identifying, as a sorting destination open point, an open point at which the shortest distance exceeds a first threshold value; a fourth step of identifying, based on the position information, data until the crusher grasping the dismantling part moves to the sorting destination and returns to the dismantling target again from among the operation trajectory data as movement data of the crusher having moved in the dismantling operation; and a fifth step of identifying data in which the movement data has been removed from the operation trajectory data as grasping operation data indicating an action until the crusher grasps the dismantling part in the dismantling operation.

According to the present invention, it is possible to efficiently analyze a dismantling operation by a crusher.

BRIEF DESCRIPTION OF DRAWINGS

FIG. 4 is a view illustrating an example of operation trajectory data used for operation analysis processing.

FIG. 8 is a view for explaining processing of identifying a sorting destination open point from all open points in the present embodiment.

FIG. 10 is a view for explaining a determination region used for identifying movement data in the present embodiment.

FIG. 12 is a view illustrating a time series transition of a cluster before integration in the present embodiment.

FIG. 13 is a view for explaining processing for integrating pre-integration data in the present embodiment.

FIG. 14 is a view illustrating a time series transition of an integrated cluster integrated by integration processing in the present embodiment.

FIG. 16 is a view illustrating an example of analysis result data for each operation cycle in the present embodiment.

FIG. 17 is a view illustrating an example of spreadsheet data obtained by gathering the number of collected analysis result data and the required time per one operation cycle in the present embodiment.

DESCRIPTION OF EMBODIMENT

An embodiment of the present invention will be described below with reference to the accompanying drawings. Note that the following embodiment is merely an example embodying the present invention and does not limit the technical scope of the present invention.

Embodiment

An operation analysis device according to an embodiment of the present invention will be described with reference to FIGS. 1 to 18.

Figure 1:
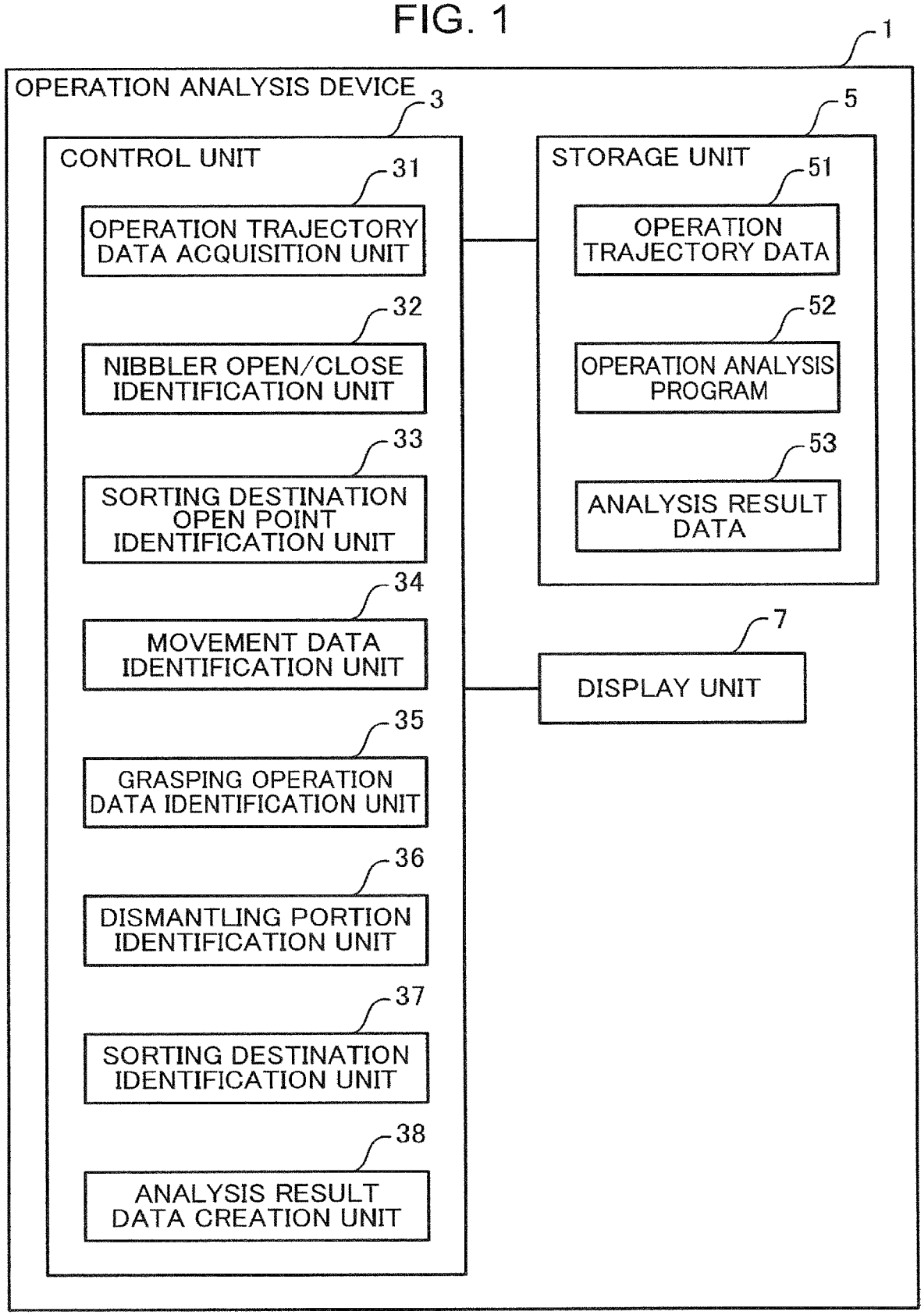
FIG. 1 is a block diagram illustrating a configuration of an operation analysis device according to an embodiment of the present invention.
Figure 2:
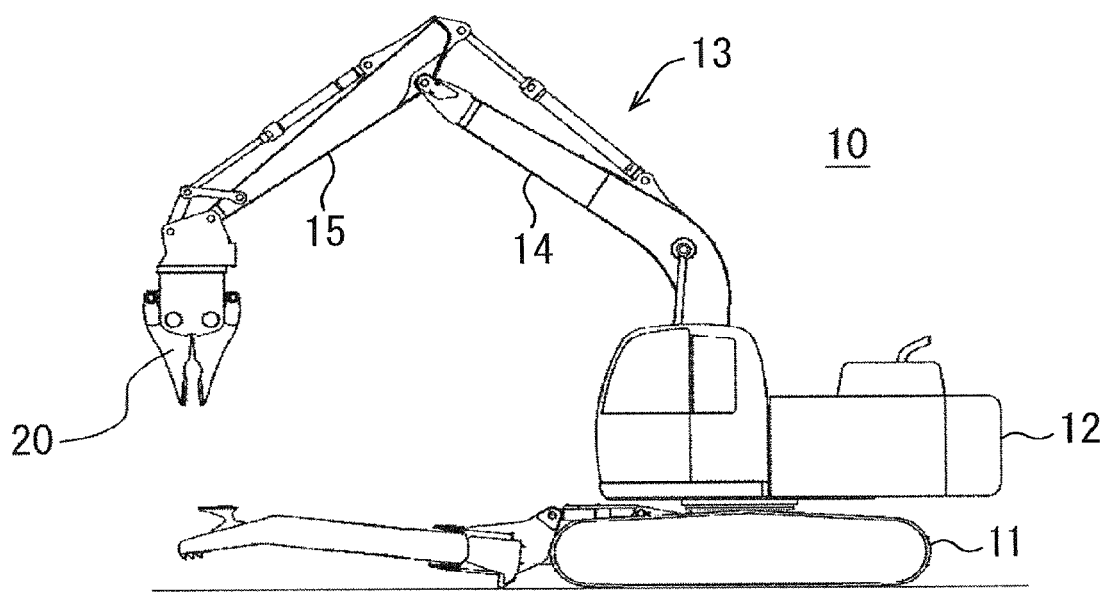
FIG. 2 is a side view illustrating an appearance of a dismantling machine in which a nibbler is attached to an operation attachment tip in an embodiment of the present invention.
Figure 3:
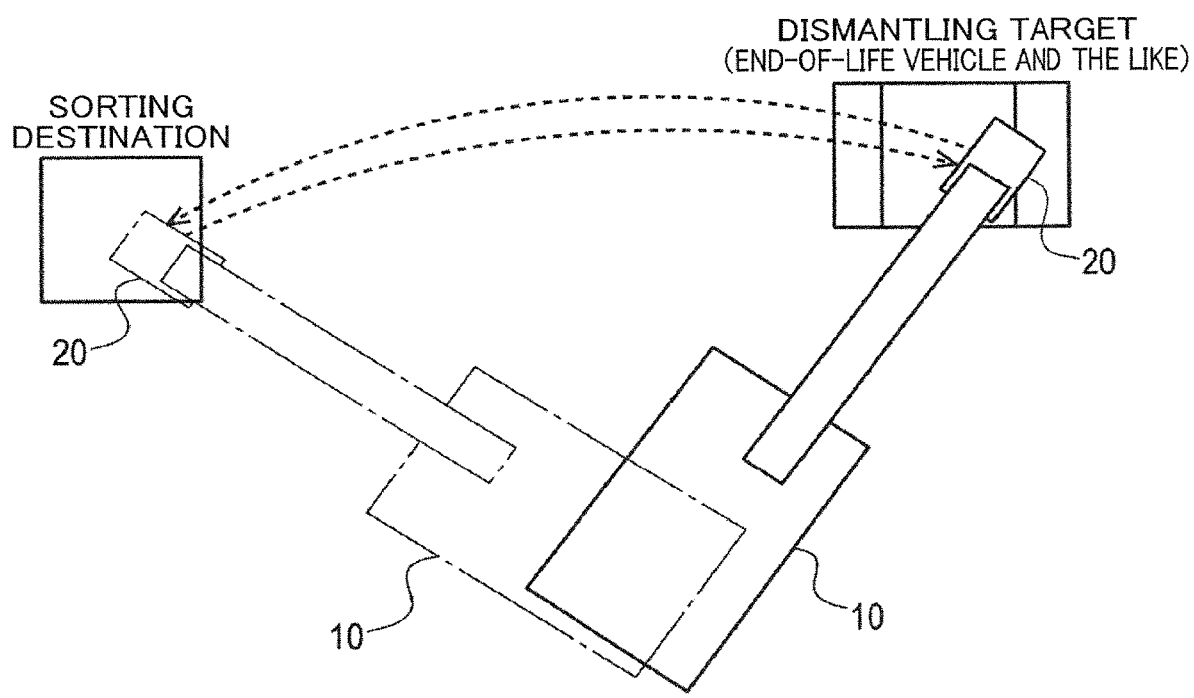
FIG. 3 is a schematic plan view for explaining an outline of a dismantling operation by the nibbler.

FIG. 1 is a block diagram illustrating the configuration of an operation analysis device according to an embodiment of the present invention. FIG. 2 is a side view illustrating an appearance of a dismantling machine in which a nibbler is attached to an operation attachment tip in an embodiment of the present invention. FIG. 3 is a schematic plan view for explaining an outline of a dismantling operation by the nibbler. An operation analysis device 1 illustrated in FIG. 1 is an example of an operation analysis device that analyzes a dismantling operation.

The operation analysis device 1 is a computer for analyzing a dismantling operation by a nibbler 20 attached to an operation attachment tip of a dismantling machine 10 illustrated in FIG. 2. The nibbler 20 is an example of a crusher. The nibbler 20 cuts a dismantling part from a dismantling target, rips a dismantling part from a dismantling target, and sorts a dismantling part.

In the present embodiment, as illustrated in FIG. 3, the dismantling machine 10 carries out the dismantling operation of repeating an action of grasping a dismantling part from a dismantling target such as an end-of-life vehicle by the nibbler 20 attached to an attachment tip of the dismantling machine 10 and an action of moving the grasped dismantling part to a sorting destination. The operation analysis device 1 analyzes the dismantling operation by the dismantling machine 10. That is, the operation analysis device 1 analyzes the dismantling operation of repeating an action of grasping a dismantling part from a dismantling target by the nibbler 20 (crusher) attached to an attachment tip of the dismantling machine 10 and an action of moving the grasped dismantling part to a sorting destination.

The dismantling machine 10 includes a lower travelling body 11 capable of traveling on the ground, an upper swiveling body 12 mounted on the lower travelling body 11, and an operation device 13 mounted on the upper swiveling body 12.

The lower travelling body 11 and the upper swiveling body 12 constitute a machine body supporting the operation device 13. The upper swiveling body 12 includes an engine room that houses an engine and a cab that is a driver's cabin. The lower travelling body 11 includes a pair of crawlers. The upper swiveling body 12 is swivelable and attached to the lower travelling body 11.

The operation device 13 can perform actions for dismantling operation and includes a boom 14, an arm 15, and the nibbler 20. The boom 14 has a base end supported on the front end of the upper swiveling body 12 in a raising and lowering manner, i.e., swivelable about a horizontal axis, and a tip end on the opposite side thereof. The arm 15 has a base end attached to a tip end of the boom 14 in a swivelable manner about a horizontal axis, and a tip end on the opposite side thereof. The nibbler 20 is swivelable and attached to the tip end of the arm 15.

A boom cylinder, an arm cylinder, and a nibbler cylinder, which are a plurality of extendable hydraulic cylinders, are attached to the boom 14, the arm 15, and the nibbler 20, respectively.

The boom cylinder is interposed between the upper swiveling body 12 and the boom 14 and expands and contracts so as to cause the boom 14 to perform a raising and lowering action. The arm cylinder is interposed between the boom 14 and the arm 15 and expands and contracts so as to cause the arm 15 to perform a swinging action. The nibbler cylinder is interposed between the arm 15 and the nibbler 20 and expands and contracts so as to cause the nibbler 20 to perform an open/close action.

As illustrated in FIG. 1, the operation analysis device 1 includes a control unit 3, a storage unit 5, and a display unit 7.

The control unit 3 is, for example, a central processing unit (CPU), and executes various types of arithmetic processing based on programs and data stored in the storage unit 5.

The storage unit 5 is, for example, a flash memory or a magnetic disk device, and stores various programs and data and also functions as a work memory of the control unit 3.

The dismantling machine 10 may include a reading device that reads information from an information storage medium such as an optical disk. The storage unit 5 may store information read by the reading device.

The display unit 7 is, for example, a liquid crystal display and displays a screen based on graphic data.

The hardware configuration described above is merely an example and is not limited thereto. For example, the above-described hardware configuration presents an example in which the storage unit 5 is incorporated in the operation analysis device 1, but the present invention is not limited to this, and a storage device communicable with the operation analysis device 1 may be externally connected. The operation analysis device 1 may not include the display unit 7, and the display device connected to the operation analysis device 1 may have the function of the display unit 7.

As illustrated in FIG. 1, the storage unit 5 stores operation trajectory data 51, an operation analysis program 52, and analysis result data 53.

The operation trajectory data 51 is time-series data in which the information of the nibbler 20 during the operation period of the dismantling operation is sampled at regular intervals. The operation trajectory data 51 records, in a time series manner, position information and open/close information of the nibbler 20 during the operation period of the dismantling operation.

FIG. 4 is a view illustrating an example of operation trajectory data used for operation analysis processing.

Specifically, as illustrated in FIG. 4, the operation trajectory data 51 includes time information, position information, and nibbler open/close information recorded in time series.

The time information represents time (T1, T2, T3, . . . ) at which each data is sampled.

The position information represents the position of the nibbler 20 in plan view by values of an X coordinate (X1, X2, X3, . . . ) and a Y coordinate (Y1, Y2, Y3, . . . ) in a plane coordinate system. The plane coordinate system is, for example, a two-dimensional Cartesian coordinate system where the longitudinal direction (front-rear direction) is the X axis, the right-left direction is the Y axis, and the joint section between the upper swiveling body and the lower travelling body on the swiveling axis of the upper swiveling body of the dismantling machine 10 is the origin. The X axis, the Y axis, and the origin of the plane coordinate system are not limited to those described above. The origin of the plane coordinate system may be, for example, the base end of the boom. The intersection point between a perpendicular line drawn from the position of the nibbler 20 in the three-dimensional space to the plane coordinate system and the plane coordinate system is the position of the nibbler 20 in the plane coordinate system.

The nibbler open/close information includes an output value (S1, S2, S3, . . . ) from a stroke sensor provided on a cylinder for opening/closing the nibbler 20.

The dismantling machine 10 may measure the position information and the nibbler open/close information at a predetermined sampling period during the dismantling operation and transmit the time information, the position information, and the nibbler open/close information to the operation analysis device 1 at a predetermined timing. The dismantling machine 10 may transmit the time information, the position information, and the nibbler open/close information every time they are measured, after the dismantling operation ends, or every predetermined time. In this case, the operation analysis device 1 may include a communication unit that communicates with the dismantling machine 10 via a network. The communication unit may store the time information, the position information, and the nibbler open/close information transmitted by the dismantling machine 10 in the storage unit 5 as the operation trajectory data 51.

The dismantling machine 10 may measure the position information and the nibbler open/close information at a predetermined sampling period during the dismantling operation and store the time information, the position information, and the nibbler open/close information in the information storage medium. The information storage medium is, for example, an optical disk, a universal serial bus (USB) memory, or the like. In this case, the operation analysis device 1 may include a reading device that reads information from the information storage medium. The reading device may store, in the storage unit 5 as the operation trajectory data 51, the time information, the position information, and the nibbler open/close information read from the information storage medium.

The operation analysis program 52 is a program for causing the control unit 3 to execute the operation analysis processing (see FIG. 5) based on the operation trajectory data 51 described above. The control unit 3 executes the operation analysis processing in accordance with the operation analysis program 52. The details of the operation analysis processing illustrated in FIG. 5 will be described later.

Figure 5:
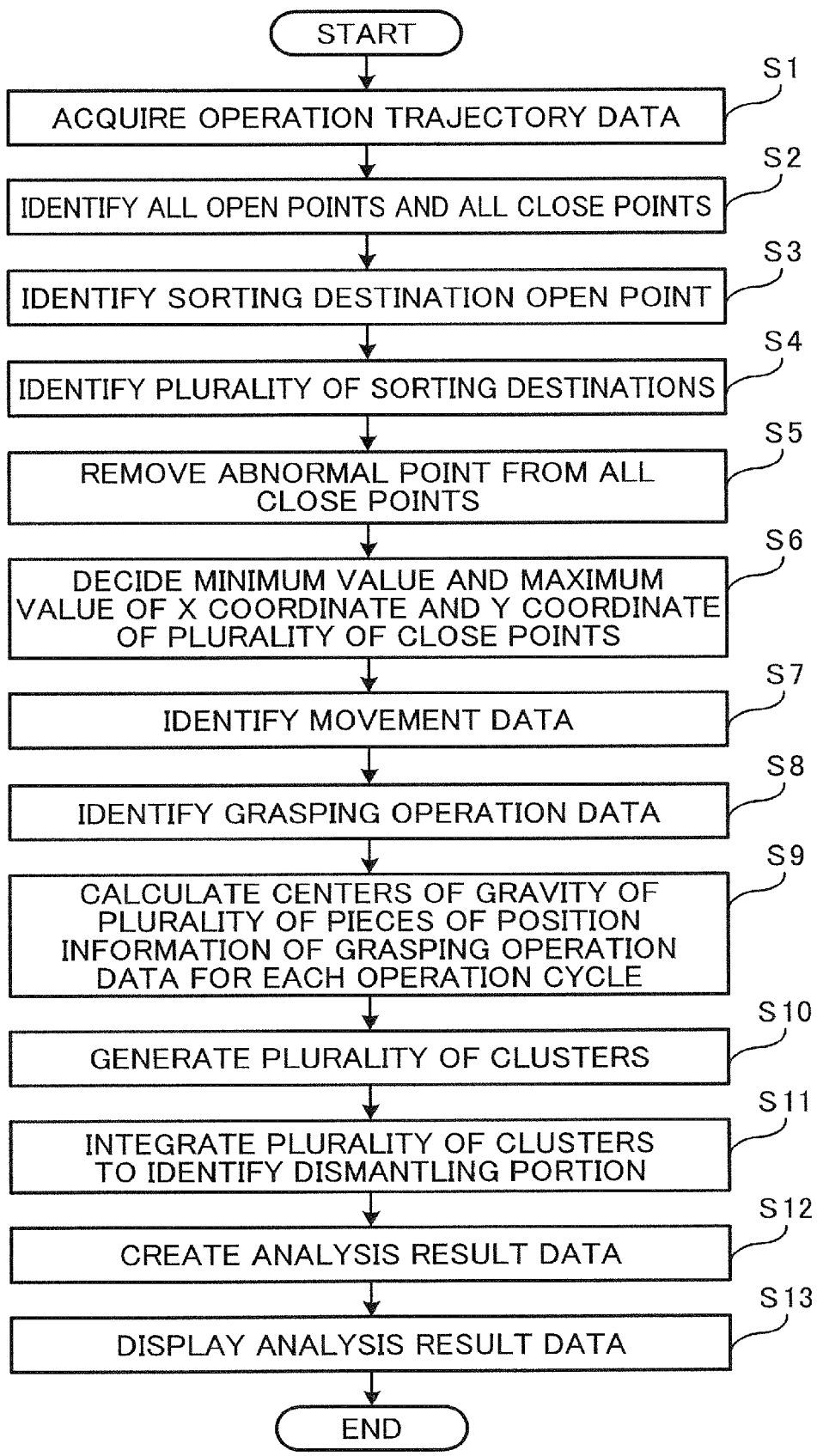
FIG. 5 is a flowchart showing an example of the operation analysis processing executed by an operation analysis device according to an embodiment of the present invention.

The analysis result data 53 is data output as a result of the operation analysis processing illustrated in FIG. 5 (see FIG. 16). The analysis result data 53 is an analysis result obtained by analyzing the dismantling operation for each operation cycle, and is also referred to as operation cycle information or the like. The details of the analysis result data 53 illustrated in FIG. 16 will be described later.

The control unit 3 analyzes the dismantling operation based on the operation trajectory data 53. The control unit 3 includes an operation trajectory data acquisition unit 31, a nibbler open/close identification unit 32, a sorting destination open point identification unit 33, a movement data identification unit 34, a grasping operation data identification unit 35, a dismantling portion identification unit 36, a sorting destination identification unit 37, and an analysis result data creation unit 38.

The operation trajectory data acquisition unit 31 acquires the operation trajectory data 51 in which the position information and the open/close information of the nibbler 20 during the operation period of the dismantling operation are recorded in time series.

The nibbler open/close identification unit 32 identifies, based on the operation trajectory data 51, all the open points indicating the position where the nibbler 20 is opened during the operation period and all the close points indicating the position where the nibbler 20 is closed during the operation period.

The nibbler open/close identification unit 32 identifies, as all close time point data, of the operation trajectory data, all the data at the time point when the output value from the stroke sensor provided in the cylinder for opening/closing the nibbler 20 exceeds a third threshold value, and identifies, as all open time point data, all the data at the time point when the output value falls below the third threshold value. The nibbler open/close identification unit 32 identifies all the close points from the individual pieces of position information of all the close time point data, and identifies all the open points from the individual pieces of position information of all the open time point data.

The sorting destination open point identification unit 33 calculates, as the shortest distance, the distance between each open point of all the open points and a close point existing nearest to each open point, and identifies, as a sorting destination open point, an open point at which the shortest distance exceeds the first threshold value.

The movement data identification unit 34 identifies, based on the position information, data until the nibbler 20 grasping the dismantling part moves to the sorting destination and returns to the dismantling target again from among the operation trajectory data as movement data of the nibbler 20 having moved in the dismantling operation.

The movement data identification unit 34 calculates the centers of gravity of all the close points, and removes, as an abnormal point, a close point having a distance from the center of gravity equal to or greater than a predetermined value. The movement data identification unit 34 decides a minimum value $X_{min}$ and a maximum value $X_{max}$ of the X coordinates, and also decides a minimum value $X_{min}$ and a maximum value $Y_{max}$ of the Y coordinates from each of X coordinates and each of Y coordinates of the plurality of close points from which the abnormal point is removed. The movement data identification unit 34 identifies, as movement data, data in which the values X and Y of the X coordinate and the Y coordinate of the operation trajectory data do not satisfy the minimum value $X_{min}$<X<the maximum value $X_{max}$ and the minimum value $Y_{min}$<Y<the maximum value $Y_{max}$. The movement data identification unit 34 identifies, as movement data, data in which the values X and Y satisfy the minimum value $X_{min}$<X<the maximum value $X_{max}$ and the minimum value $Y_{min}$<Y<the maximum value $Y_{max}$, and the movement mean of the speed is equal to or greater than a second threshold value.

The grasping operation data identification unit 35 identifies data in which the movement data is removed from the operation trajectory data, as grasping operation data indicating the action until the nibbler 20 grasps the dismantling part in the dismantling operation.

The dismantling portion identification unit 36 identifies a dismantling portion in the dismantling target based on the grasping operation data. The dismantling portion identification unit 36 calculates the centers of gravity of the plurality of pieces of position information of the grasping operation data for each operation cycle as a dismantling place in a predetermined operation cycle. The dismantling portion identification unit 36 generates a plurality of clusters by clustering X coordinates and Y coordinates of a plurality of dismantling places for each operation cycle. The dismantling portion identification unit 36 identifies a dismantling portion by integrating the plurality of clusters based on a time series transition of the plurality of clusters.

The sorting destination identification unit 37 identifies a plurality of sorting destinations by clustering sorting destination open points identified by the sorting destination open point identification unit 33.

The analysis result data creation unit 38 creates the analysis result data 53 by executing operation analysis processing. The analysis result data creation unit 38 stores the created analysis result data 53 in the storage unit 5.

The display unit 7 displays the analysis result data 53 created by the analysis result data creation unit 38.

Next, the operation analysis processing executed by the operation analysis device 1 will be described in detail with reference to FIG. 5.

FIG. 5 is a flowchart showing an example of the operation analysis processing executed by the operation analysis device according to an embodiment of the present invention.

As described above, the dismantling operation to be analyzed in the present embodiment is a periodic operation of repeating an action of grasping a dismantling part from a dismantling target such as an end-of-life vehicle and an action of carrying the grasped dismantling part to the sorting destination (see FIG. 3).

Therefore, in the operation analysis processing by the operation analysis program 52, the dismantling operation is broken down into a plurality of operation cycles. Specifically, an action in which the nibbler 20 grasps a dismantling part, an action in which the nibbler 20 moves to a sorting destination, an action in which the nibbler 20 places the dismantling part to the sorting destination, and an action in which the nibbler 20 returns to the dismantling target again are defined as one operation cycle. The series of dismantling operation is broken down into the plurality of operation cycles.

First, in step S1 of FIG. 5, the operation trajectory data acquisition unit 31 acquires, as input data, the operation trajectory data 51 (see FIG. 2) stored in the storage unit 5.

Next, in step S2, the nibbler open/close identification unit 32 reads the operation trajectory data 51 and identifies all open points indicating positions (plane coordinate system) where the nibbler 20 is opened during the operation period and all close points indicating positions (plane coordinate system) where the nibbler 20 is closed.

Specifically, the nibbler open/close identification unit 32 identifies, as close time point data, data at a time point when the nibbler open/close information (output value of the stroke sensor) exceeds a threshold value TH3 from among the data constituting the operation trajectory data 51. The nibbler open/close identification unit 32 identifies, as open time point data, data at a time point when the nibbler open/close information (output value of the stroke sensor) falls below the threshold value TH3. Note that the threshold value TH3 is an arbitrary value set in advance, and is an example of the third threshold value according to the present invention.

The nibbler open/close identification unit 32 identifies all the close points based on the position information of the close time point data and identifies all the open points based on the position information of the open time point data.

Figure 6:
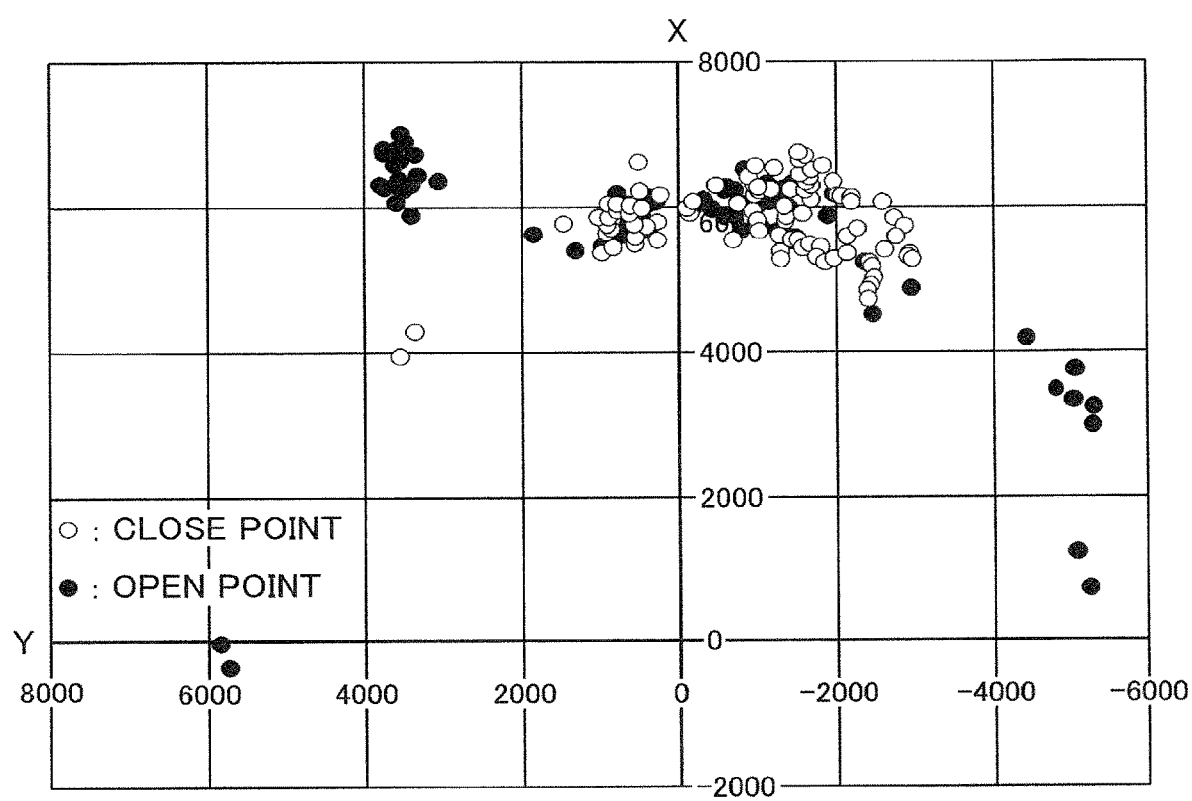
FIG. 6 is a scatter diagram in which close points and open points of the nibbler are plotted in a plane coordinate system in the present embodiment.

FIG. 6 is a scatter diagram in which close points and open points of the nibbler are plotted in a plane coordinate system in the present embodiment. In FIG. 6, the vertical axis represents the X axis, and the horizontal axis represents the Y axis. The white circle dots represent close points, and the black circle dots represent open points. The X coordinate and the Y coordinate represent the distance from the origin, and the unit of the distance is millimeters (mm).

In the scatter diagram of FIG. 6, all the close points and all the open points identified by the nibbler open/close identification unit 32 are plotted in the plane coordinate system. The close point represents the position coordinates at the time point when the nibbler 20 is closed from an open state. The open point represents the position coordinates at the time point when the nibbler 20 is opened from a close state.

Returning to FIG. 5, next, in step S3, the sorting destination open point identification unit 33 identifies a sorting destination open point from all the open points identified by the nibbler open/close identification unit 32. Here, the sorting destination open point means an open point at which the nibbler 20 is opened at the sorting destination in order to place the dismantling parts at the sorting destination.

Specifically, the sorting destination open point identification unit 33 calculates the distance between each open point constituting all open points and all close points, and identifies the shortest close point existing nearest to each open point. The sorting destination open point identification unit 33 calculates the distance from each open point to the shortest close point as the shortest distance.

Figure 7:
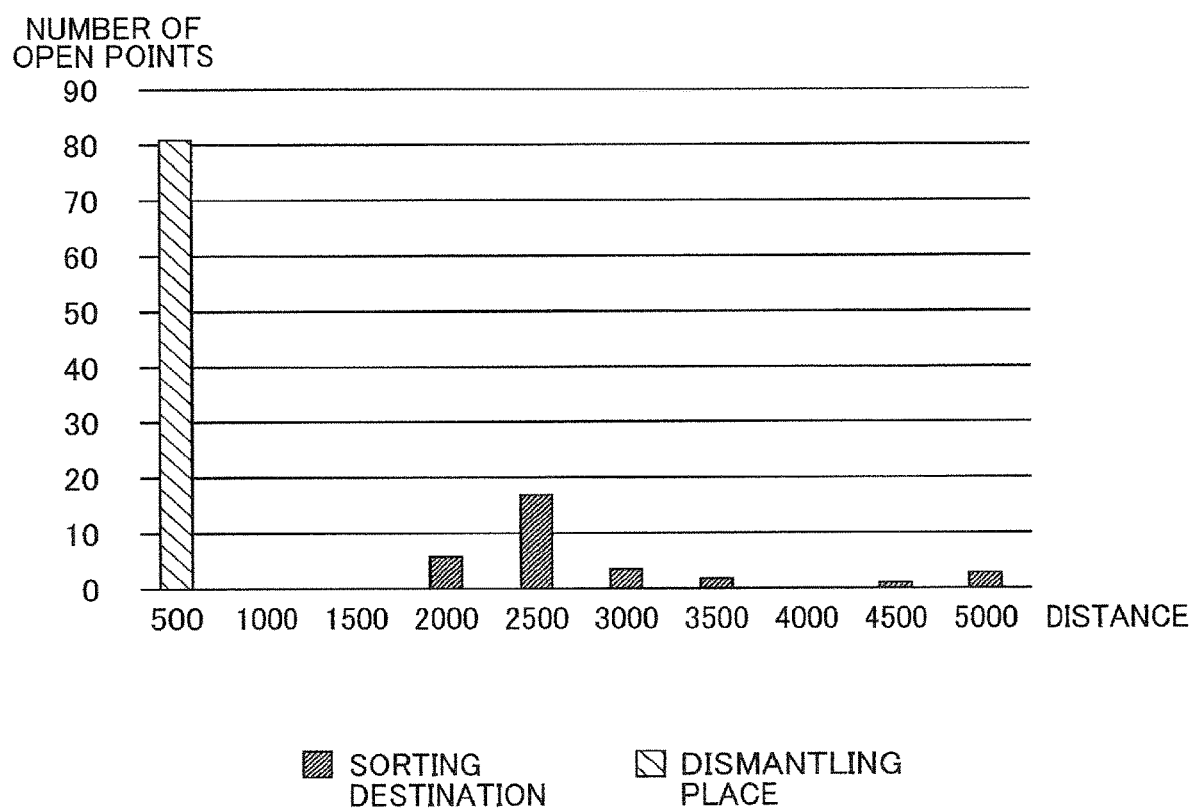
FIG. 7 is a histogram presenting the relationship between the number of open points and the distance (shortest distance) between each open point and the shortest close point in the present embodiment.

FIG. 7 is a histogram presenting the relationship between the number of open points and the distance (shortest distance) between each open point and the shortest close point in the present embodiment. In FIG. 7, the horizontal axis represents a class in which the distance (shortest distance) between each open point and the shortest close point is divided by every 500 mm, and the vertical axis represents the number of open points belonging to each class.

In FIG. 7, the shortest distance from each open point to the shortest close point is indicated by a histogram.

The open point at which the shortest distance is equal to or less than a threshold value TH1 is highly likely to be an open point associated with an open/close operation for the nibbler 20 to grasp the dismantling part at the dismantling place. In the operation until the dismantling part is grasped, the nibbler 20 is opened and closed at substantially the same position. Therefore, the shortest distance between the open point and the shortest close point at the dismantling place tends to be short. Note that the threshold value TH1 is an arbitrary value set in advance, and is an example of the first threshold value according to the present invention.

On the other hand, the open point at which the shortest distance exceeds the threshold value TH1 is highly likely to be an open point associated with an open operation for the nibbler 20 to separate the dismantling part at the sorting destination for the purpose of placing the dismantling part at the sorting destination. The nibbler 20 is not closed during a period from when the nibbler 20 is opened at the sorting destination to when the nibbler 20 returns to the dismantling place. Therefore, the shortest distance between the open point and the shortest close point at the sorting destination tends to be long.

In consideration of the above circumstances, the sorting destination open point identification unit 33 identifies, as a sorting destination open point, an open point at which the shortest distance exceeds the threshold value TH1 (see FIG. 8).

FIG. 8 is a view for explaining processing of identifying a sorting destination open point from all open points in the present embodiment. In FIG. 8, the vertical axis represents the X axis, and the horizontal axis represents the Y axis. The white circle dots represent close points, and the black circle dots represent open points. The X coordinate and the Y coordinate represent the distance from the origin, and the unit of the distance is millimeters (mm).

In the lower diagram of FIG. 8, the sorting destination open points identified by the sorting destination open point identification unit 33 among all the open points are plotted in a plane coordinate system.

Returning to FIG. 5, next, in step S4, the sorting destination identification unit 37 identifies a plurality of sorting destinations by clustering the sorting destination open points identified by the sorting destination open point identification unit 33.

Figure 9:
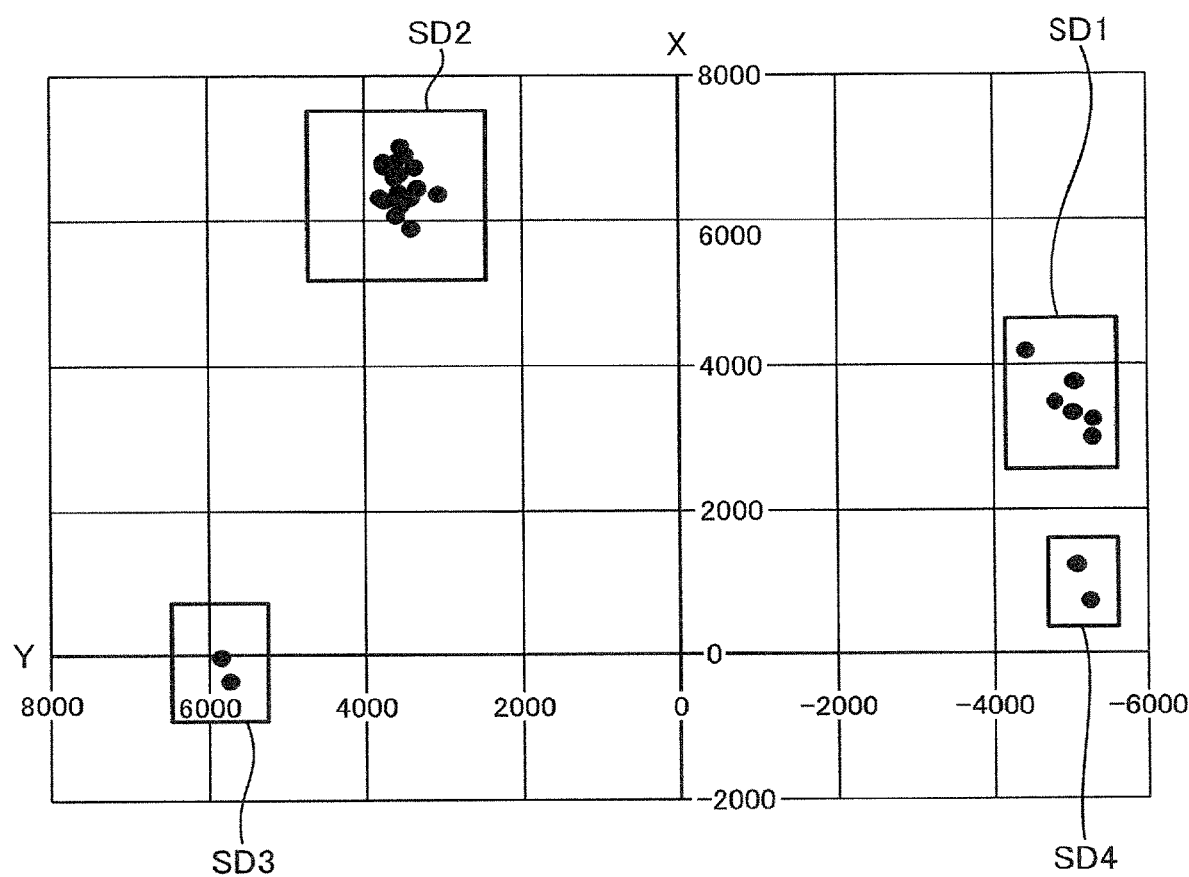
FIG. 9 is a view illustrating a state in which sorting destination open points are clustered into a plurality of sorting destinations (clusters) in the present embodiment.

FIG. 9 is a view illustrating a state in which sorting destination open points are clustered into a plurality of sorting destinations (clusters) in the present embodiment.

In the present embodiment, as illustrated in FIG. 9, four sorting destinations SD1 to SD4 are identified by clustering a plurality of sorting destination open points.

Thereafter, the control unit 3 executes the processing of steps S5 to S7 for breaking down the dismantling operation into a plurality of operation cycles.

Returning to FIG. 5, next, in step S5, the movement data identification unit 34 executes abnormal point removal processing of removing an abnormal point from all close points. Specifically, the movement data identification unit 34 calculates the centers of gravity of all the close points, and removes, as an abnormal point, the close point having a distance from the calculated center of gravity equal to or greater than a predetermined value. The nibbler 20 is closed when the dismantling part is cut from the dismantling target or the dismantling target is grasped. Therefore, the close point at a position away from the center of gravity of all the close points is removed as an abnormal point.

Next, in step S6, the movement data identification unit 34 decides the minimum value $X_{min}$ and the maximum value $X_{max}$ of the X coordinates, and also decides the minimum value $Y_{min}$ and the maximum value $Y_{max}$ of the Y coordinates from each of X coordinates and each of Y coordinates of the plurality of close points from which the abnormal point is removed.

FIG. 10 is a view for explaining a determination region used for identifying movement data in the present embodiment.

When the minimum value $X_{min}$ and the maximum value $X_{max}$ of the X coordinates and the minimum value $Y_{min}$ and the maximum value $Y_{max}$ of the Y coordinates are decided, a determination region 101 used in processing for identifying the movement data is determined as presented in the lower diagram of FIG. 10. The determination region 101 is a region in which the X coordinate satisfies $X_{min}<X<X_{max}$ and the Y coordinate satisfies $Y_{min}<Y<Y_{max}$ from each X coordinate and each Y coordinate of the plurality of close points from which the abnormal point has been removed.

Returning to FIG. 5, next, in step S7, the movement data identification unit 34 identifies the movement data based on the position information of the operation trajectory data. Here, the movement data means data from when the nibbler 20 grasps the dismantling part (after grasping) to when it moves to the sorting destination and returns to the dismantling place of the dismantling target again.

Specifically, the movement data identification unit 34 identifies, as movement data, data in which the values X and Y of the X coordinate and the Y coordinate of the position information of the operation trajectory data do not satisfy the minimum value $X_{min}<X<$the maximum value $X_{max}$ and the minimum value $Y_{min}<Y<$the maximum value $Y_{max}$. That is, the movement data identification unit 34 identifies, as movement data, the operation trajectory data outside the determination region 101 illustrated in FIG. 10.

The movement data identification unit 34 also identifies, as movement data, data in which the values X and Y of the X coordinate and the Y coordinate of the position information of the operation trajectory data satisfy the minimum value $X_{min}<X<$the maximum value $X_{max}$ and the minimum value $Y_{min}<Y<$the maximum value $Y_{max}$, and the movement mean of the speed calculated using the preceding and subsequent data is equal to or greater than a predetermined threshold value TH2. That is, the movement data identification unit 34 also identifies, as movement data, the operation trajectory data in which the movement mean of the speed calculated using the preceding and subsequent data among the operation trajectory data in the determination region 101 illustrated in FIG. 10 is equal to or greater than the threshold value TH2. Note that the threshold value TH2 is an arbitrary value set in advance, and is an example of the second threshold value according to the present invention.

As described above, one operation cycle in the dismantling operation is a period until the nibbler 20 grasps the dismantling part, moves to the sorting destination, places the dismantling part on the sorting destination, and returns to the dismantling target again. Since the grasping operation starts from the end point of movement (time point when the nibbler 20 returns to the dismantling target), one operation cycle of the dismantling operation can be considered to be from the end point of movement to the end point of the next movement. Therefore, if the movement data can be identified from the operation trajectory data, the dismantling operation can be broken down into a plurality of operation cycles.

Next, in step S8, the grasping operation data identification unit 35 identifies the data in which the movement data identified by the movement data identification unit 34 has been removed from the operation trajectory data 51, as grasping operation data indicating the action until the nibbler 20 separates the dismantling part from the dismantling target and grasps it.

When the grasping operation data is identified, the control unit 3 executes the processing of steps S9 to S11 for identifying the dismantling portion (dashboard, engine room, and the like of the end-of-life vehicle) of the dismantling target.

Next, in step S9, the dismantling portion identification unit 36 calculates, as a dismantling place in a predetermined operation cycle for each operation cycle, the centers of gravity of the plurality of pieces of position information of the grasping operation data identified by the grasping operation data identification unit 35. During the dismantling operation, the dismantling part is grasped and separated, and hence the grasping operation data includes not only one piece of position information (open point or close point) but also a plurality of pieces of position information. The dismantling portion identification unit 36 calculates the centers of gravity of the plurality of pieces of position information of the grasping operation data for each operation cycle.

Next, in step S10, the dismantling portion identification unit 36 generates a plurality of clusters by clustering the X coordinates and Y coordinates of the plurality of dismantling places calculated for each operation cycle. Specifically, by using a known k-means clustering, the dismantling portion identification unit 36 clusters the X coordinates and Y coordinates of the plurality of dismantling places calculated for each operation cycle. Here, the number of clusters of the k-means clustering is set to 5 (k=5), for example.

Figure 11:
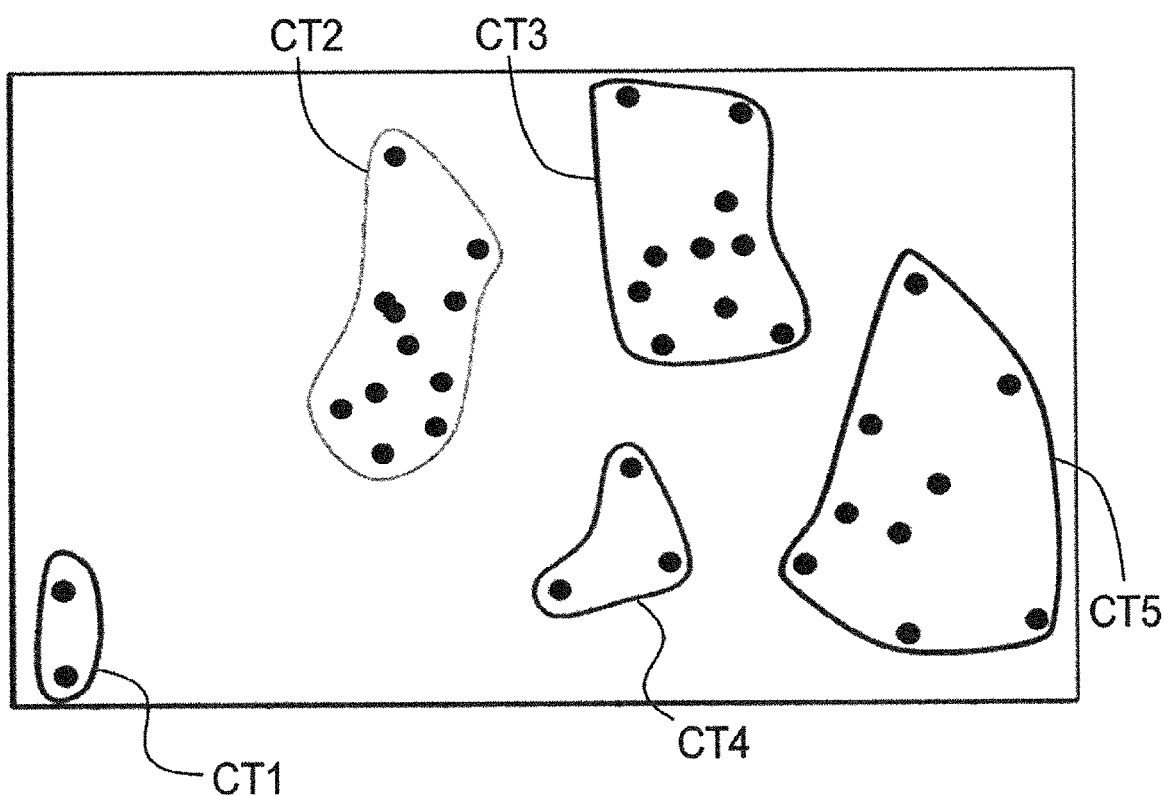
FIG. 11 is a view illustrating a result of clustering a plurality of dismantling places (centers of gravity) into a plurality of clusters in the present embodiment.

FIG. 11 is a view illustrating a result of clustering a plurality of dismantling places (centers of gravity) into a plurality of clusters in the present embodiment.

As a result of clustering using the k-means clustering by the dismantling portion identification unit 36, the plurality of dismantling places (centers of gravity) are divided into five clusters CT1 to CT5 as illustrated in FIG. 11.

Returning to FIG. 5, next, in step S11, the dismantling portion identification unit 36 identifies the dismantling portion by integrating the plurality of clusters based on the time series transition of the plurality of clusters. The dismantling portion identification unit 36 executes integration processing of integrating the five clusters clustered in step S10. The five clusters are likely to include a placement place in which the dismantling part is temporarily placed before being carried to the sorting destination, together with the actual dismantling portion (dashboard, engine room, and the like). Therefore, in step S11, in order to avoid the temporary placement place of the dismantling part from being erroneously determined as the actual dismantling portion, the dismantling portion identification unit 36 executes the integration processing as described below.

Specifically, the dismantling portion identification unit 36 acquires data included in the five clusters from among the operation trajectory data, and identifies, as a time series transition, how the nibbler 20 moved among the five clusters.

FIG. 12 is a view illustrating a time series transition of the cluster before integration in the present embodiment.

In FIG. 12, the time series transitions of the five clusters CT1 to CT5 illustrated in FIG. 11 are presented in order from left to right. For convenience of explanation, the time series transition of the data belonging to the five clusters CT1 to CT5 illustrated in FIG. 12 is referred to as pre-integration data. The numerical values 1 to 5 illustrated in FIG. 12 correspond to the clusters CT1 to CT5, respectively.

The dismantling portion identification unit 36 confirms the cluster of pre-integration data in order of time series, and when a cluster different from the immediately preceding cluster appears, skips the cluster until the same cluster as the immediately preceding cluster appears. The control unit 3 converts the skipped cluster into the same cluster as the immediately preceding cluster.

FIG. 13 is a view for explaining processing for integrating pre-integration data in the present embodiment.

For example, in the pre-integration data illustrated in FIG. 12, the third cluster CT2 from the beginning is different from the immediately preceding (second) cluster CT3. Therefore, as illustrated in FIG. 13, when a cluster different from the immediately preceding cluster appears, the dismantling portion identification unit 36 skips the cluster until the same cluster as the immediately preceding (second) cluster CT3 appears. Here, the same cluster as the immediately preceding (second) cluster CT3 appears fifth. Therefore, the dismantling portion identification unit 36 skips the third cluster CT2 and the fourth cluster CT2. Then, the dismantling portion identification unit 36 changes the skipped third cluster CT2 and fourth cluster CT2 to the same cluster CT3 as the second cluster CT3. The same processing is executed for the subsequent clusters.

Note that when the same cluster as the immediately preceding cluster does not appear thereafter, the dismantling portion identification unit 36 does not change the skipped cluster to the same cluster as the immediately preceding cluster.

For example, in the pre-integration data illustrated in FIG. 12, the cluster CT3 does not appear after the 23rd cluster CT3. In this case, as illustrated in FIG. 13, the dismantling portion identification unit 36 does not change the 24th and subsequent clusters to the same cluster CT3 as the 23rd cluster CT3. Similarly, the cluster CT2 does not appear after the 24th cluster CT2. Also in this case, the dismantling portion identification unit 36 does not change the 25th and subsequent clusters into the same cluster CT2 as the 24th cluster CT2.

On the other hand, regarding the 26th cluster CT5, the cluster CT5 appears 29th. Therefore, the dismantling portion identification unit 36 changes the skipped 27th cluster CT4 and 28th cluster CT1 to the same cluster CT5 as the 26th cluster CT5.

Figure 15:
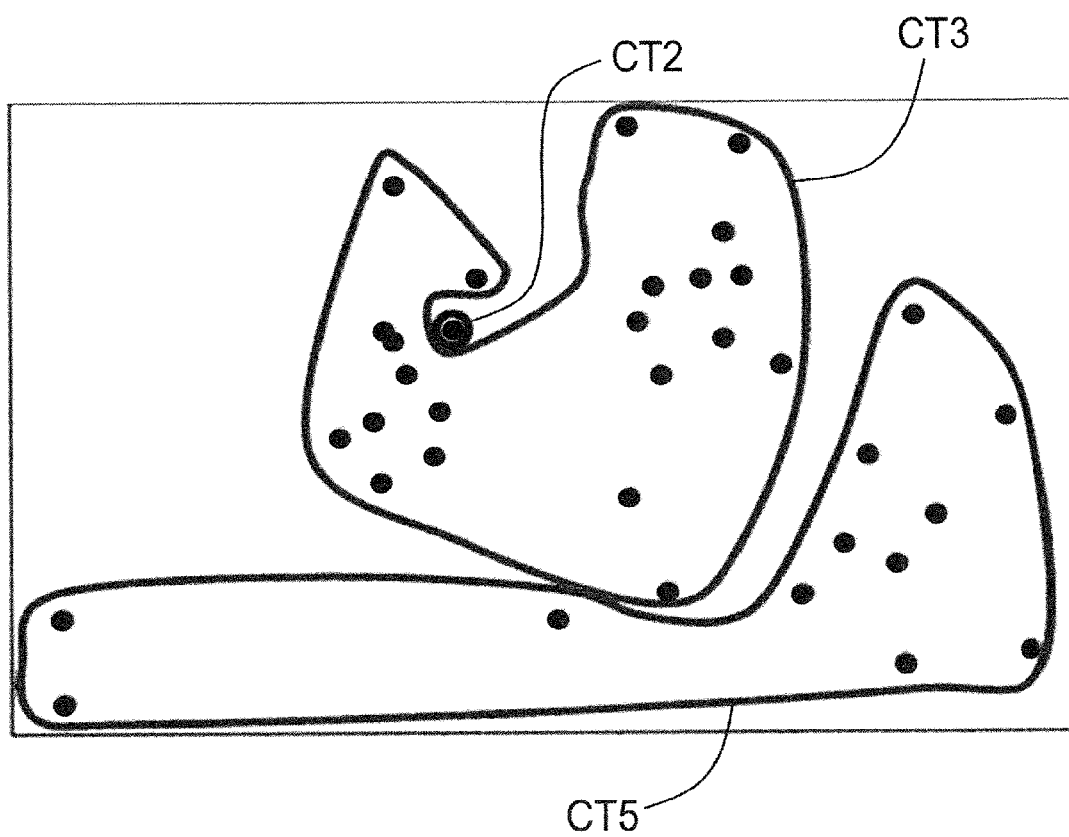
FIG. 15 is a view illustrating a result of integrating a plurality of clusters by the integration processing in the present embodiment.

FIG. 14 is a view illustrating a time series transition of an integrated cluster integrated by integration processing in the present embodiment. FIG. 15 is a view illustrating a result of integrating a plurality of clusters by the integration processing in the present embodiment.

The integration processing described above is executed, and the pre-integration data illustrated in FIG. 12 is integrated into the post-integration data illustrated in FIG. 14. As a result of the integration processing, the first to 23rd data belong to the cluster CT3, the 24th data belongs to the cluster CT2, and the 25th to 34th data belong to the cluster CT5.

As illustrated in FIGS. 14 and 15, the five clusters CT1 to CT5 are integrated into three clusters CT3, CT2, and CT5. The integrated clusters CT3, CT2, and CT5 indicate the dismantling portion of the dismantling target. The dismantling portion identification unit 36 identifies a plurality of integrated clusters as a plurality of dismantling portions.

Returning to FIG. 5, in step S12, the analysis result data creation unit 38 generates the analysis result data 53 in which the dismantling operation is analyzed.

FIG. 16 is a view illustrating an example of analysis result data for each operation cycle in the present embodiment.

The analysis result data 53 illustrated in FIG. 16 is created by executing the operation analysis processing as in steps S1 to S1.1 illustrated in FIG. 5. The analysis result data creation unit 38 creates the analysis result data 53 in which the dismantling operation is analyzed for each operation cycle.

As illustrated in FIG. 16, the analysis result data 53 includes information regarding the operation cycle, information regarding element operation time, information regarding a sorting destination nibbler open point, information regarding the center of gravity of the dismantling place, and information regarding nibbler close.

The information regarding the operation cycle includes a serial number assigned to identify each operation cycle and a start time of each operation cycle.

The information regarding the element operation time includes the grasping time required for grasping operation of the nibbler 20 in each operation cycle and the movement time required for movement of the nibbler 20 in each operation cycle.

The information regarding the sorting destination nibbler open point includes position information (X coordinate and Y coordinate) of the sorting destination open point at which the nibbler 20 is opened at the sorting destination and a cluster number for identifying the cluster to which the sorting destination open point belongs.

The information regarding the center of gravity of the dismantling place includes position information (X coordinate and Y coordinate) of the dismantling place (center of gravity) and a cluster number for identifying the cluster to which the dismantling place belongs. The cluster to which the dismantling place belongs is one of a plurality of post-integration clusters newly generated by generating a plurality of pre-integration clusters by clustering a plurality of dismantling places and integrating the generated plurality of pre-integration clusters.

The information regarding nibbler close includes the number of times the nibbler 20 is closed and the time required to close the nibbler 20.

By executing the operation analysis processing described above, the analysis result data creation unit 38 may create spreadsheet data 54 in which the analysis result data 53 are further summarized.

FIG. 17 is a view illustrating an example of spreadsheet data obtained by gathering the number of collected analysis result data and the required time per one operation cycle in the present embodiment.

The spreadsheet data 54 is obtained by gathering the number of times of collection and the time required per one operation cycle.

Examples of the dismantling portion include a dashboard, an engine room, and others. The dismantling portion can be identified based on the three clusters CT3, CT2, and CT5 integrated in step S11 of FIG. 5. For example, the storage unit 5 may store in advance dismantling portion data in which the dismantling target and the position of the dismantling portion are associated with each other. With reference to the dismantling portion data of the storage unit 5, the analysis result data creation unit 38 may identify a plurality of dismantling portions from the position of the close points belonging to the plurality of respective integrated clusters. Note that the dismantling portion data may be stored for each dismantling target type, or may be stored for each end-of-life vehicle type.

The collection objects are, for example, a harness, a left front side, a left back side, and a right side. The collection objects can be identified based on the four sorting destinations SD1 to SD4 identified in step S4 of FIG. 5. For example, the storage unit 5 may store in advance collection object data in which the collection object and the position of the sorting destination are associated with each other. With reference to the collection object data of the storage unit 5, the analysis result data creation unit 38 may identify a plurality of collection objects from the position of the sorting destination open points belonging to the plurality of respective identified sorting destinations. Note that the collection object data may be stored for each dismantling target type, or may be stored for each end-of-life vehicle type.

For each of the plurality of dismantling portions, the analysis result data creation unit 38 calculates the maximum value, the minimum value, the mean value, and the standard deviation of the grasping time of the nibbler 20 for each operation cycle. For each of the plurality of dismantling portions, the analysis result data creation unit 38 calculates the maximum value, the minimum value, the mean value, and the standard deviation of the movement time of the nibbler 20 for each operation cycle.

For each of the plurality of collection objects (sorting destinations), the analysis result data creation unit 38 calculates the maximum value, the minimum value, the mean value, and the standard deviation of the grasping time of the nibbler 20 for each operation cycle. For each of the plurality of collection objects (sorting destinations), the analysis result data creation unit 38 calculates the maximum value, the minimum value, the mean value, and the standard deviation of the movement time of the nibbler 20 for each operation cycle.

Returning to FIG. 5, next, in step S13, the display unit 7 displays the analysis result data 53 created by the analysis result data creation unit 38. The display unit 7 may display not only the analysis result data 53 but also the spreadsheet data 54.

As described above, according to the present embodiment, by executing the operation analysis program 52 (processing of the flowchart of FIG. 5), it is possible to automatically analyze the dismantling operation by the nibbler 20 based on the operation trajectory data 51 (FIG. 4) of the nibbler 20.

It is possible to analyze whether the layout of the sorting destination is appropriate by calculating how much time is required to move the dismantling part to the sorting destination based on the movement data until the nibbler 20 grasping the dismantling part moves to the sorting destination and returns to the dismantling target again. It is possible to analyze the degree of skill of the operation technique on the dismantling machine 10 by calculating how much time is required to grasp the dismantling part based on the grasping operation data indicating the action until the nibbler 20 grasps the dismantling part in the dismantling operation.

Therefore, as compared with the conventional analysis method in which the analyst analyzes a dismantling operation by viewing a moving image of the dismantling operation, it is possible to shorten the time required for analysis of the dismantling operation by the nibbler 20 and it is possible to efficiently analyze the dismantling operation by the nibbler 20.

Specifically, by comparing and examining the individual movement time on the spreadsheet data 54 illustrated in FIG. 17, the analyst can understand the operator's lack of knowledge of setting the layout of the dismantling place. Specifically, by comparing the movement time of the collection objects (sorting destinations) requiring a large number of times of collection with the movement time of the collection objects (sorting destinations) requiring a small number of times of collection, the analyst can understand the problem that the layout has not been designed so that the operator can move the collection objects (sorting destinations) requiring a large number of times of collection in a short time.

From the fact that the mean time of grasping the spreadsheet data 54 illustrated in FIG. 17 is long or the standard deviation of the grasping time is large (large variation), the analyst can understand a problem such as the operator's lack of knowledge of dismantling procedure.

Alternatively, the analyst may generate and view a cumulative graph of the grasping time in the analysis result data 53 illustrated in FIG. 16. Thus, for example, if it is found that the grasping time has not been shortened even after a plurality of operation cycles, the analyst can understand a problem such as the operator's lack of knowledge of the dismantling procedure.

From the fact that the analysis result data 53 illustrated in FIG. 16 has a large number of times of nibbler close or a long time of nibbler close, the analyst can identify that there is a large amount of grasping failure, and can understand a problem such as the operator's lack of skill in operation of the dismantling machine.

Alternatively, by viewing the mean time of the grasping time or the mean time of the movement time of the spreadsheet data 54 illustrated in FIG. 17, if it is found that the grasping time of a specific collection object is long or the movement time to a specific sorting destination is long, for example, the analyst can understand a problem of the operator's lack of skill in operation of the dismantling machine.

Similarly, by viewing the standard deviation of the grasping time or the standard deviation of the movement time of the spreadsheet data 54 illustrated in FIG. 17, if it is found that the variation in the grasping time of a specific collection object is large or the variation in the movement time to a specific sorting destination is large, for example, the analyst can understand a problem of the operator's lack of skill in operation of the dismantling machine.

Figure 18:
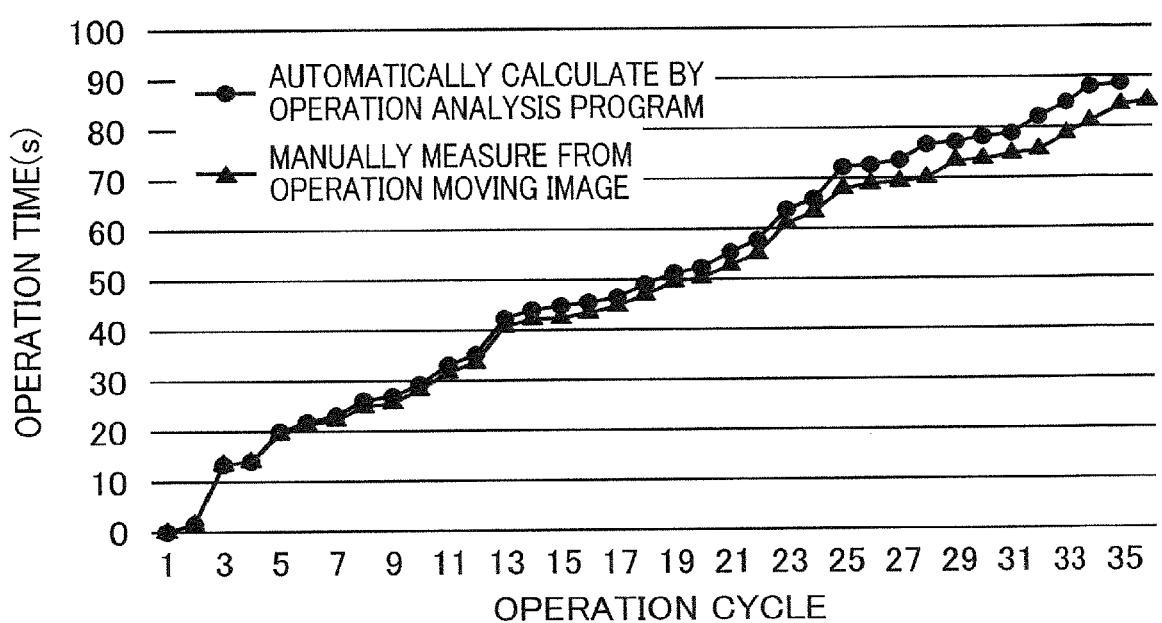
FIG. 18 is a view illustrating a cumulative value of the operation time for each operation cycle automatically calculated by an operation analysis program and a cumulative value of the operation time for each operation cycle manually measured from an operation moving image.

FIG. 18 is a view illustrating a cumulative value of the operation time for each operation cycle automatically calculated by an operation analysis program and a cumulative value of the operation time for each operation cycle manually measured from an operation moving image.

The cumulative graph illustrated in FIG. 18 illustrates a cumulative value of the required operation time for each operation cycle automatically calculated by an operation analysis program 52 and a cumulative value of the required operation time for each operation cycle manually measured from an operation moving image. As illustrated in FIG. 18, although there are some differences between the both, they substantially coincide with each other. Therefore, the operation analysis device 1 according to the present embodiment can acquire information equivalent to that acquired by the manual analysis based on the operation moving image.

Modification

The operation analysis method according to the present invention is not limited to the above-described embodiment, and various modifications or improvements can be made within the scope of the claims.

For example, in the above embodiment, as illustrated in step S4 of the flowchart of FIG. 5, the sorting destination identification unit 37 identifies the plurality of sorting destinations, but the present invention is not limited thereto. In the case of analyzing a dismantling operation in which the sorting destination is determined to be one portion, the sorting destination identification unit 37 may not execute the processing of step S4. However, if it is unclear whether the sorting destination is single or multiple, it is preferable that the sorting destination identification unit 37 executes the processing of step S4 as in the above embodiment.

In the above embodiment, as illustrated in steps S9 to S11 of the flowchart of FIG. 5, the dismantling portion identification unit 36 identifies the dismantling portion of the dismantling target, but the present invention is not limited thereto. In the case of analyzing a dismantling operation in which the dismantling portion is determined to be one portion, the dismantling portion identification unit 36 may not execute the processing of steps S9 to S11.

Summary of Embodiment

The technical features of the present embodiment are summarized as follows.

An operation analysis method according to an aspect of the present invention is an operation analysis method in an operation analysis device that analyzes a dismantling operation of repeating an action of grasping a dismantling part from a dismantling target by a crusher attached to an attachment tip of a dismantling machine and an action of moving the grasped dismantling part to a sorting destination, the operation analysis method including: a first step of acquiring operation trajectory data in which position information and open/close information of the crusher during an operation period of the dismantling operation are recorded in time series; a second step of identifying, based on the operation trajectory data, all open points indicating positions at which the crusher is opened during the operation period and all close points indicating positions at which the crusher is closed during the operation period; a third step of calculating, as a shortest distance, a distance between each open point of the all open points and a close point nearest to the each open point, and identifying, as a sorting destination open point, an open point at which the shortest distance exceeds a first threshold value; a fourth step of identifying, based on the position information, data until the crusher grasping the dismantling part moves to the sorting destination and returns to the dismantling target again from among the operation trajectory data as movement data of the crusher having moved in the dismantling operation; and a fifth step of identifying data in which the movement data has been removed from the operation trajectory data as grasping operation data indicating an action until the crusher grasps the dismantling part in the dismantling operation.

According to this configuration, it is possible to analyze whether the layout of the sorting destination is appropriate by calculating how much time is required to move the dismantling part to the sorting destination based on the movement data until the crusher grasping the dismantling part moves to the sorting destination and returns to the dismantling target again. It is possible to analyze the degree of skill of the operation technique on the dismantling machine by calculating how much time is required to grasp the dismantling part based on the grasping operation data indicating the action until the crusher grasps the dismantling part in the dismantling operation.

Therefore, as compared with the conventional analysis method in which the analyst analyzes a dismantling operation by viewing a moving image of the dismantling operation, it is possible to shorten the time required for analysis of the dismantling operation by the crusher and it is possible to efficiently analyze the dismantling operation by the crusher.

In the operation analysis method described above, the position information represents a position of the crusher by values of an X coordinate and a Y coordinate in a plane coordinate system, and the fourth step may include a step of calculating centers of gravity of the all close points and removing, as an abnormal point, a close point having a distance from the center of gravity equal to or greater than a predetermined value; a step of deciding a minimum value $X_{min}$ and a maximum value $X_{max}$ of X coordinates, and also deciding a minimum value $Y_{min}$ and a maximum value $Y_{max}$ of Y coordinates from each of X coordinates and each of Y coordinates of a plurality of close points from which the abnormal point is removed; and a step of identifying, as movement data, data in which values X and Y of an X coordinate and a Y coordinate of the operation trajectory data do not satisfy the minimum value $X_{min}$<X<the maximum value $X_{max}$ and the minimum value $Y_{min}$<Y<the maximum value $Y_{max}$, and identifying, as movement data, data in which the values X and Y satisfy the minimum value $X_{min}$<X<the maximum value $X_{max}$ and the minimum value $Y_{min}$<Y<the maximum value $Y_{max}$ and a movement mean of speed is equal to or greater than a second threshold value.

According to this configuration, the minimum value $X_{min}$ and the maximum value $X_{max}$ of the X coordinates are decided, and the minimum value $Y_{min}$ and the maximum value $Y_{max}$ of the Y coordinates are also decided from each of X coordinates and each of Y coordinates of the plurality of close points from which the abnormal point is removed. Then, the data in which the values X and Y of the X coordinate and the Y coordinate of the operation trajectory data do not satisfy the minimum value $X_{min}$<X<the maximum value $X_{max}$ and the minimum value $Y_{min}$<Y<the maximum value $Y_{max}$ is identified as movement data. This excludes the open point and the close point when the crusher opens/closes for grasping the dismantling part in the vicinity of the dismantling target, and hence it is possible to surely identify the movement data until the crusher moves from the dismantling target to the sorting destination. The data in which the values X and Y satisfy the minimum value $X_{min}$<X<the maximum value $X_{max}$ and the minimum value $Y_{min}$<Y<the maximum value $Y_{max}$, and the movement mean of the speed is equal to or greater than a second threshold value is identified as movement data. This identifies, as movement data, the close point for moving the dismantling part to the sorting destination even in the vicinity of the dismantling target, and hence it is possible to surely identify the movement data until the crusher moves from the dismantling target to the sorting destination.

The operation analysis method described above further includes a sixth step of identifying a dismantling portion in the dismantling target based on the grasping operation data, wherein the position information represents a position of the crusher by values of an X coordinate and a Y coordinate in a plane coordinate system, and the sixth step may include a step of calculating centers of gravity of a plurality of pieces of position information of the grasping operation data for each operation cycle as a dismantling place in a predetermined operation cycle, a step of generating a plurality of clusters by clustering X coordinates and Y coordinates of a plurality of dismantling places calculated for each of the operation cycles, and a step of identifying a dismantling portion by integrating the plurality of clusters based on a time series transition of the plurality of clusters.

According to this configuration, a plurality of clusters are generated by clustering the X coordinates and Y coordinates of the plurality of dismantling places. Then, the plurality of clusters are integrated based on a time series transition of the plurality of clusters, and the position of each integrated cluster is identified as a dismantling portion.

Therefore, a placement place in which the dismantling part is temporarily placed before being moved to the sorting destination can be avoided from being erroneously identified as a dismantling portion, and it is possible to accurately identify the dismantling portion of the dismantling target.

In the operation analysis method, the open/close information includes an output value from a stroke sensor provided in a cylinder for opening/closing the crusher, and the second step may include a step of identifying, as all close time point data, all data at a time point when the output value exceeds a third threshold value, of the operation trajectory data, and identifying, as all open time point data, all data at a time point when the output value falls below the third threshold value, and a step of identifying the all close points from individual pieces of position information of the all close time point data, and identifying the all open points from individual pieces of position information of the all open time point data.

According to this configuration, it is possible to easily determine whether the crusher is opened or closed in accordance with the output value from the stroke sensor provided in the cylinder for opening/closing the crusher.

The operation analysis method described above may further include a seventh step of identifying a plurality of sorting destinations by clustering a plurality of sorting destination open points identified in the third step.

According to this configuration, it is possible to easily identify a plurality of sorting destinations of a dismantling part by clustering a plurality of sorting destination open points.

An operation analysis device according to another aspect of the present invention is an operation analysis device that analyzes a dismantling operation of repeating an action of grasping a dismantling part from a dismantling target by a crusher attached to an attachment tip of a dismantling machine and an action of moving the grasped dismantling part to a sorting destination, the operation analysis device including: a storage unit that stores operation trajectory data in which position information and open/close information of the crusher during an operation period of the dismantling operation are recorded in time series; and a control unit that analyzes the dismantling operation based on the operation trajectory data, wherein the control unit identifies, based on the operation trajectory data, all open points indicating positions at which the crusher is opened during the operation period and all close points indicating positions at which the crusher is closed during the operation period, calculates, as a shortest distance, a distance between each open point of the all open points and a close point nearest to the each open point, and identifies, as a sorting destination open point, an open point at which the shortest distance exceeds a first threshold value, identifies, based on the position information, data until the crusher grasping the dismantling part moves to the sorting destination and returns to the dismantling target again from among the operation trajectory data as movement data of the crusher having moved in the dismantling operation, and identifies data in which the movement data has been removed from the operation trajectory data as grasping operation data indicating an action until the crusher grasps the dismantling part in the dismantling operation.

According to this configuration, it is possible to analyze whether the layout of the sorting destination is appropriate by calculating how much time is required to move the dismantling part to the sorting destination based on the movement data until the crusher grasping the dismantling part moves to the sorting destination and returns to the dismantling target again. It is possible to analyze the degree of skill of the operation technique on the dismantling machine by calculating how much time is required to grasp the dismantling part based on the grasping operation data indicating the action until the crusher grasps the dismantling part in the dismantling operation.

Therefore, as compared with the conventional analysis method in which the analyst analyzes a dismantling operation by viewing a moving image of the dismantling operation, it is possible to shorten the time required for analysis of the dismantling operation by the crusher and it is possible to efficiently analyze the dismantling operation by the crusher.

An operation analysis program according to another aspect of the present invention is an operation analysis program for analyzing a dismantling operation of repeating an action of grasping a dismantling part from a dismantling target by a crusher attached to an attachment tip of a dismantling machine and an action of moving the grasped dismantling part to a sorting destination, the operation analysis program causing a computer to execute: a first step of acquiring operation trajectory data in which position information and open/close information of the crusher during an operation period of the dismantling operation are recorded in time series; a second step of identifying, based on the operation trajectory data, all open points indicating positions at which the crusher is opened during the operation period and all close points indicating positions at which the crusher is closed during the operation period; a third step of calculating, as a shortest distance, a distance between each open point of the all open points and a close point nearest to the each open point, and identifying, as a sorting destination open point, an open point at which the shortest distance exceeds a first threshold value; a fourth step of identifying, based on the position information, data until the crusher grasping the dismantling part moves to the sorting destination and returns to the dismantling target again from among the operation trajectory data as movement data of the crusher having moved in the dismantling operation; and a fifth step of identifying data in which the movement data has been removed from the operation trajectory data as grasping operation data indicating an action until the crusher grasps the dismantling part in the dismantling operation.

According to this configuration, it is possible to analyze whether the layout of the sorting destination is appropriate by calculating how much time is required to move the dismantling part to the sorting destination based on the movement data until the crusher grasping the dismantling part moves to the sorting destination and returns to the dismantling target again. It is possible to analyze the degree of skill of the operation technique on the dismantling machine by calculating how much time is required to grasp the dismantling part based on the grasping operation data indicating the action until the crusher grasps the dismantling part in the dismantling operation.

Therefore, as compared with the conventional analysis method in which the analyst analyzes a dismantling operation by viewing a moving image of the dismantling operation, it is possible to shorten the time required for analysis of the dismantling operation by the crusher and it is possible to efficiently analyze the dismantling operation by the crusher.

INDUSTRIAL APPLICABILITY

Since the technique according to the present invention is capable of analyzing a dismantling operation of repeating an action of grasping a dismantling part from a dismantling target by a crusher attached to an operation attachment tip of a dismantling machine and an action of moving the grasped dismantling part to a sorting destination, it is useful as a technique for analyzing a dismantling operation.

The invention claimed is:

1. An operation analysis method in an operation analysis device that analyzes a dismantling operation of repeating an action of grasping a dismantling part from a dismantling target by a crusher attached to an attachment tip of a dismantling machine and an action of moving the grasped dismantling part to a sorting destination, the operation analysis method comprising:
   a first step of acquiring operation trajectory data in which position information and open/close information of the crusher during an operation period of the dismantling operation are recorded in time series;
   a second step of identifying, based on the operation trajectory data, all open points indicating positions at which the crusher is opened during the operation period and all close points indicating positions at which the crusher is closed during the operation period;
   a third step of calculating, as a shortest distance, a distance between each open point of the all open points and a close point nearest to the each open point, and identifying, as a sorting destination open point, an open point at which the shortest distance exceeds a first threshold value;
   a fourth step of identifying, based on the position information, data until the crusher grasping the dismantling part moves to the sorting destination and returns to the dismantling target again from among the operation trajectory data as movement data of the crusher having moved in the dismantling operation; and
   a fifth step of identifying data in which the movement data has been removed from the operation trajectory data as grasping operation data indicating an action until the crusher grasps the dismantling part in the dismantling operation.

2. The operation analysis method according to claim 1, wherein
   the position information represents a position of the crusher by values of an X coordinate and a Y coordinate in a plane coordinate system, and
   the fourth step includes
   a step of calculating centers of gravity of the all close points and removing, as an abnormal point, a close point having a distance from the center of gravity equal to or greater than a predetermined value,
   a step of deciding a minimum value $X_{min}$ and a maximum value $X_{max}$ of X coordinates, and also deciding a minimum value $Y_{min}$ and a maximum value $Y_{max}$ of Y coordinates from each of X coordinates and each of Y coordinates of a plurality of close points from which the abnormal point is removed, and
   a step of identifying, as movement data, data in which values X and Y of an X coordinate and a Y coordinate of the operation trajectory data do not satisfy the minimum value $X_{min} < X <$ the maximum value $X_{max}$ and the minimum value $Y_{min} < Y <$ the maximum value $Y_{max}$, and identifying, as movement data, data in which the values X and Y satisfy the minimum value $X_{min} < X <$ the maximum value $X_{max}$ and the minimum value $Y_{min} < Y <$ the maximum value $Y_{max}$ and a movement mean of speed is equal to or greater than a second threshold value.

3. The operation analysis method according to claim 1, further comprising:
   a sixth step of identifying a dismantling portion in the dismantling target based on the grasping operation data,
   wherein the position information represents a position of the crusher by values of an X coordinate and a Y coordinate in a plane coordinate system, and the sixth step includes
a step of calculating centers of gravity of a plurality of pieces of position information of the grasping operation data for each operation cycle as a dismantling place in a predetermined operation cycle,
a step of generating a plurality of clusters by clustering X coordinates and Y coordinates of a plurality of dismantling places calculated for each of the operation cycles, and
a step of identifying a dismantling portion by integrating the plurality of clusters based on a time series transition of the plurality of clusters.

4. The operation analysis method according to claim 1, wherein
the open/close information includes an output value from a stroke sensor provided in a cylinder for opening/closing the crusher, and
the second step includes
a step of identifying, as all close time point data, all data at a time point when the output value exceeds a third threshold value, of the operation trajectory data, and identifying,
as all open time point data, all data at a time point when the output value falls below the third threshold value, and
a step of identifying the all close points from individual pieces of position information of the all close time point data, and identifying the all open points from individual pieces of position information of the all open time point data.

5. The operation analysis method according to claim 1, further comprising a seventh step of identifying a plurality of sorting destinations by clustering a plurality of sorting destination open points identified in the third step.

6. An operation analysis device that analyzes a dismantling operation of repeating an action of grasping a dismantling part from a dismantling target by a crusher attached to an attachment tip of a dismantling machine and an action of moving the grasped dismantling part to a sorting destination, the operation analysis device comprising:
a storage unit that stores operation trajectory data in which position information and open/close information of the crusher during an operation period of the dismantling operation are recorded in time series; and
a control unit that analyzes the dismantling operation based on the operation trajectory data,
wherein the control unit
identifies, based on the operation trajectory data, all open points indicating positions at which the crusher is opened during the operation period and all close points indicating positions at which the crusher is closed during the operation period,
calculates, as a shortest distance, a distance between each open point of the all open points and a close point nearest to the each open point, and identifies, as a sorting destination open point, an open point at which the shortest distance exceeds a first threshold value,
identifies, based on the position information, data until the crusher grasping the dismantling part moves to the sorting destination and returns to the dismantling target again from among the operation trajectory data as movement data of the crusher having moved in the dismantling operation, and
identifies data in which the movement data has been removed from the operation trajectory data as grasping operation data indicating an action until the crusher grasps the dismantling part in the dismantling operation.

7. A non-transitory computer readable recording medium storing an operation analysis program for analyzing a dismantling operation of repeating an action of grasping a dismantling part from a dismantling target by a crusher attached to an attachment tip of a dismantling machine and an action of moving the grasped dismantling part to a sorting destination, the operation analysis program causing a computer to execute:
a first step of acquiring operation trajectory data in which position information and open/close information of the crusher during an operation period of the dismantling operation are recorded in time series;
a second step of identifying, based on the operation trajectory data, all open points indicating positions at which the crusher is opened during the operation period and all close points indicating positions at which the crusher is closed during the operation period;
a third step of calculating, as a shortest distance, a distance between each open point of the all open points and a close point nearest to the each open point, and identifying, as a sorting destination open point, an open point at which the shortest distance exceeds a first threshold value;
a fourth step of identifying, based on the position information, data until the crusher grasping the dismantling part moves to the sorting destination and returns to the dismantling target again from among the operation trajectory data as movement data of the crusher having moved in the dismantling operation; and
a fifth step of identifying data in which the movement data has been removed from the operation trajectory data as grasping operation data indicating an action until the crusher grasps the dismantling part in the dismantling operation.

* * * * *